United States Patent

Snyder

[15] 3,659,287

[45] Apr. 25, 1972

[54] METHOD AND APPARATUS FOR TRANSMITTING INFORMATION IN METER READING

[72] Inventor: Carl J. Snyder, Raleigh, N.C.

[73] Assignee: Westinghouse Electric Corporation, Pittsburgh, Pa.

[22] Filed: June 24, 1970

[21] Appl No.: 49,132

[52] U.S. Cl. ................................340/347 P, 340/357
[51] Int. Cl. ......................................G08c 9/00, H04l 13/16
[58] Field of Search ......................340/347 P, 357, 358, 151; 324/137

[56] References Cited

UNITED STATES PATENTS

| | | | |
|---|---|---|---|
| 3,268,884 | 8/1966 | Yanis et al. | 340/347 UX |
| 2,866,184 | 12/1958 | Gray | 340/347 UX |
| 2,972,740 | 2/1961 | Lahti | 340/347 UX |
| 2,733,008 | 1/1956 | D'Andrea et al. | 340/347 UX |

OTHER PUBLICATIONS

Ward Chapter 6, Notes on A-D Conversion Techniques, July 1957, pages 6–60 to 6–64, The Technology Press, MIT

*Primary Examiner*—Maynard R. Wilbur
*Assistant Examiner*—Thomas J. Sloyan
*Attorney*—A. T. Stratton and C. L. Freedman

[57] ABSTRACT

For transmitting information representing the reading of a watthour meter a first disc is rotated in 32 steps per revolution by the meter. A second disc has 32 step positions and is rotated one step for each revolution of the first disc. Each disc has commutators and commutator brushes which convert each angular position of the disc into a distinctive binary signal which is transmitted to a suitable receiver or translator.

4 Claims, 2 Drawing Figures

METHOD AND APPARATUS FOR TRANSMITTING INFORMATION IN METER READING

CROSS-REFERENCE TO RELATED APPLICATIONS

Apparatus for transmitting information from a meter to a remote point is disclosed in a copending U.S. Pat. application Ser. No. 18,188, filed Mar. 10, 1970, by Rodney V. Adams et al.

BACKGROUND OF THE INVENTION

1. Field of the Invention

This invention relates to the transmission of information from a meter to a remote point and it has particular relation to the transmission of information from a watthour meter.

Description of the Prior Art

It is the practice for a company such as a Public Utility to supply a number of services such as electric energy, heat, water and gas to consumers. It is common practice for a Utility to charge each consumer an amount based on the quantity of the service supplied to the consumer.

In order to determine the amount of the service supplied to each consumer a meter is usually installed on the premises of each consumer for measuring each service. At the end of each billing period employees of the utilities proceed to the premises of the consumers for the purpose of reading the meters.

Many systems have been proposed for reading meters automatically. On such a system an encoder may be provided on each meter to be read and a scanner may be associated with each encoder.

To illustrate prior art proposals reference may be made to the U.S. Pat. No. 3,299,423.

SUMMARY OF THE INVENTION

The invention provides a translating unit which includes an encoder, and a scanner. The invention is particularly suitable for, and will be described as applied to, an electric meter such as a watthour meter.

The encoder converts analog information derived from the meter into a form more suitable for transmission. Desirably each of the encoders may take the form of an analog-to-digital converter which converts analog information derived from the associated meter into digital information in binary form which may be recorded or transmitted to a central station. A scanning device successively transmits information from each of the encoders to the central station.

The encoder includes a first element in the form of a commutator which is rotated in steps having a number in excess of 10, preferably 32, per revolution by the meter. A second similar element is rotated one step for each revolution of the first element. Each commutator applies through brushes a binary signal which is distinctive for each step.

Where translating units are associated with both fluid and electric meters preferably all electric energy required for operation of the translating units is derived from the source of electric energy being measured by the electric meter.

BRIEF DESCRIPTION OF THE DRAWINGS

For a better understanding of the invention reference may be had to the preferred embodiment exemplary of the invention shown in the accompanying drawings, in which.

DESCRIPTION OF THE PREFERRED EMBODIMENT

Figure 1:
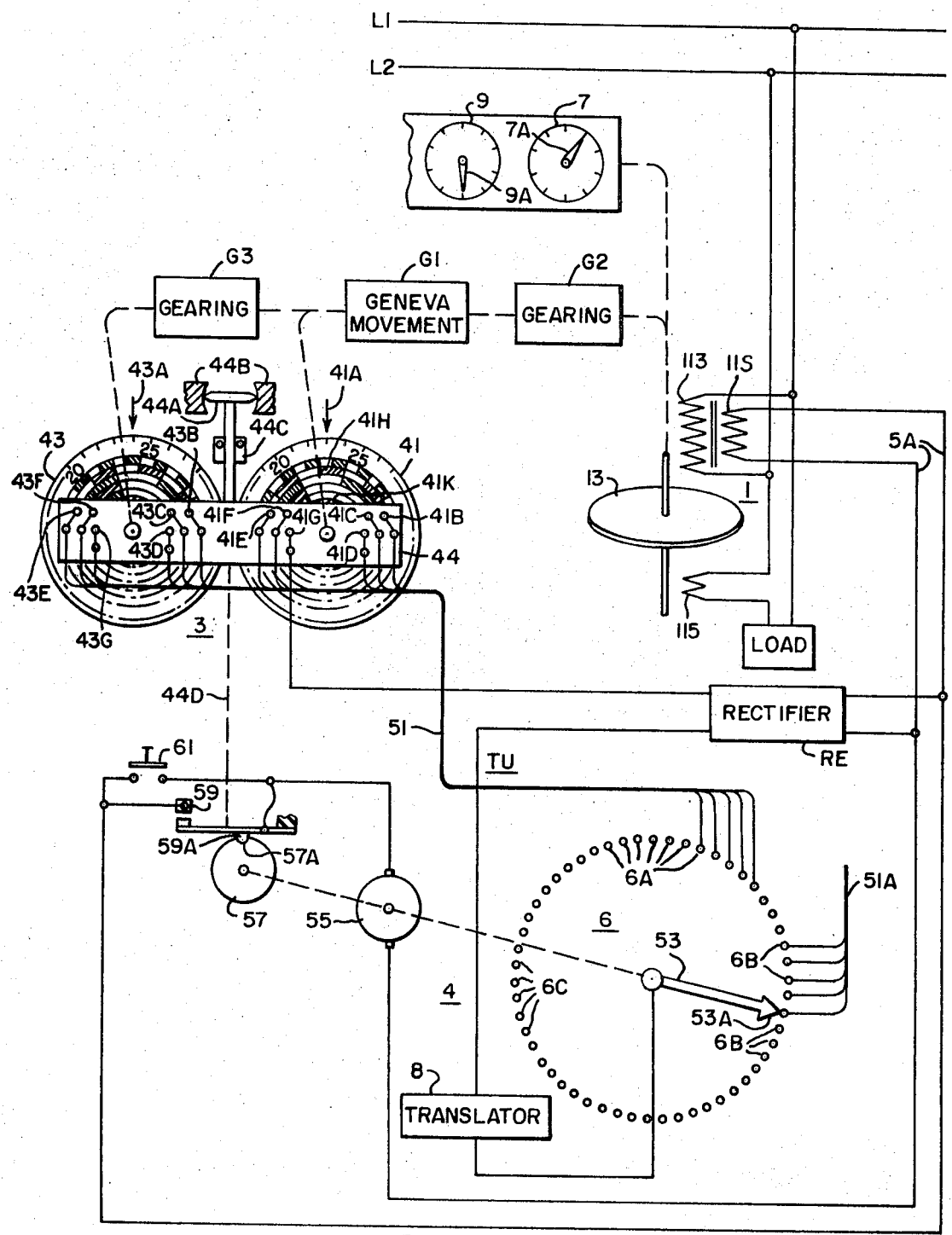
FIG. 1 is a schematic view in block form with parts in perspective and parts in front elevation showing a translating unit associated with a meter.

Referring to the drawing, FIG. 1 shows a meter 1 which is to be read. It will be assumed for present purposes that the meter 1 is an electric watthour meter. Information from the meter is derived in analog form and is supplied to a translating unit TU including an encoder 3 which converts the analog information into a form more suitable for transmission to a suitable translator.

The translating unit TU also includes a scanner 4 which is employed for interrogating successively the outputs of the encoder and for transmitting the information derived from the encoder successively to a suitable translator 8. If the communication link to the translator so requires, an interface also is included in the translating unit TU for the purpose of modifying the output of the scanner suitably for transmission to the translator.

Electric energy for operating the translating unit preferably is derived from the source of electric energy measured by the electric meter through a circuit 5A.

To simplify the presentation of the invention it will be assumed that the meter 1 is of the type illustrated in the Ramsey, Jr. et al. U.S. Pat. No. 3,309,152, which issued Mar. 14, 1967. This patent discloses a conventional register 133 which is reproduced in part in the present FIG. 1, with the armature disc 13, voltage winding 113 and current windings 115 having the same reference characters applied thereto. The conventional register employs several decade counters for the purpose of indicating the electric energy, usually in kilowatt hours, which has been supplied by a Public Utility to the metering station. For example, the units dial 7 has a pointer 7A mounted for rotation relative thereto for the purpose of indicating units of kilowatt hours from 0 to 10. A second dial 9 has a pointer 9A mounted for rotation relative thereto for the purpose of indicating kilowatt hours in the amount of 10 to 100. Several orders of dials and pointers are usually provided and the aforesaid patent shows five orders of pointers and dials in an arrangement which is well known in the art.

It will be assumed that the meter 1 is energized from a single-phase two-wire alternating-current circuit operating at a power frequency such as 60 Hertz and represented by conductors L1 and L2.

The winding 113 which corresponds to the voltage winding of the aforesaid patent is shown connected across the conductors L1 and L2.

For illustrative purposes the translating unit TU is energized from the conductors L1 and L2 through a transformer 11 having as a primary winding the voltage winding 113 and having a secondary winding 11S which is designed to have an output voltage preferably less than 20 volts, such as a voltage of the order of 12 volts.

At the encoder 3 a suitable device is provided for converting the analog information represented by rotation of the armature disc 13 into digital information. The device illustrated includes a dial 41 which is coupled through a Geneva movement G1 and gearing G2 to the disc 13 for rotation in steps relative to an index mark 41A. The dial is divided into a predetermined number of divisions or steps in excess of 10, 32 divisions in the embodiment here shown, and these divisions are numbered on the edge of the dial as shown. A second similar dial 43 is moved relative to an index mark 43A. The dial 43 is coupled to the dial 41 for a jump movement of one step (11 ¼° in the example shown) upon completion of each revolution of the dial 41. The dial 41 is arranged to step or jump one step or division for each predetermined rotation of the disc 13.

Digital information representing the angular position of each step of each of the dials is derived. To this end a plurality of brushes are associated with commutators and a conductive ring on the face of each dial. Thus six brushes 41B to 41G for the dial 41 are mounted on a plate 44 which is secured to a shaft 44A pivotally mounted by pivots 44B so that the brushes can be rotated into and out of engagement with commutators in the face of the dial 41. Each of the brushes 41B to 41F is positioned to engage a separate circular array of conductive segments constituting a commutator on the face of the dial 41. Each conductive segment is maintained at a predetermined voltage relative to ground preferably derived from the secondary winding 11S through a rectifier RE. The brush 41G engages a continuous conductive ring 41K on the dial 41 and serves as a common connection for all conductive segments of the commutators which are connected together. When a brush such as the brush 41B engages a conductive segment such as the segment 41H the brush has a binary one value. When the brush engages an insulation section of the commutator it has a binary zero value. By proper construction of the commutators the voltages applied to the brushes 41B to 41F represent in binary form the angular position of the dial for each of its 32 steps. This type of converter is well known and is discussed for example on page 284 of Digital Computer Fundamentals by Thomas C. Bartee, published by McGraw-Hill Book Company, Inc., New York City.

According to the invention the outermost commutator has more than ten alternate conductive and non-conductive segments, preferably 32 in all. Assuming that n segments are employed, the four remaining commutators progressing radially inward preferably have $n/2$, $n/4$, $n/8$ and $n/16$ segments.

Brushes 43B to 43G are similarly associated with the dial 43.

Each of the dials 41 and 43 generates or defines a five bit binary number. One of the six brushes (e.g. brush 41G) is a ground or common-return brush. The higher-order dial 43 generates the first five highest order bits of a 10-bit number and the right-hand dial 41 establishes the five lower order bits. With a 10-bit binary number available for transmission a count of 1,023 can be registered before a recurrent zero is reached. If each bit represents 10 kilowatt hours a count of 10,000 kilowatt hours can be registered and this is adequate for conventional meters. This is achieved with only two dials.

The brushes for the encoder 3 are connected by a cable 51 to members of a group of scanner contacts 6A located in the scanner 6. The group of scanner contacts may include contacts which generate a binary identification number to identify the specific meter being read. This number may be transmitted immediately before the reading of the meter is transmitted. Another group of scanner contacts 6B of the scanner 6 has members which are connected by a cable 51A to the corresponding brushes of a similar encoder for another meter. A third group of scanner contacts of the scanner 6 may have members connected similarly by a cable (not shown) to a third encoder for a third meter as indicated in the aforesaid Adams et al application. Binary identification numbers may be generated for each of the groups of scanner contacts.

The scanner contacts of the scanner are interrogated by a brush 53A carried by an arm 53 which is mounted on the shaft of a synchronous motor 55. Consequently when the arm 53 is rotated the brush associated therewith picks off successively the voltages applied to the brushes and these voltages are then transmitted by the brush to a first input terminal of the translator 8 which may be a recording device for recording the information on a medium such as tape or it may be a computer for performing any desired function such as billing.

The output terminals of the rectifier RE are connected respectively to the brush 41G for each dial and to a second input terminal of the translator 8. If the brush 41B engages the contact segment 41H when the scanner brush 53A reaches the corresponding scanner contact 6A a circuit is completed which may be traced from the upper terminal of the rectifier RE to the brush 41G, the ring 41K, the contact segment 41H, the brush 41B, the cable 51, the associated scanner contact 6A, the brush 53A, and the input terminals of the translator to the lower output terminal of the rectifier. This applies a one-bit to the translator.

At the end of each billing period the synchronous motor 55 may be energized to make one revolution for the purpose of interrogating the various encoders. Any number of encoders could be provided as desired. Such operation is illustrated by a cam 57 mounted on the motor shaft and having a recess 57A. A switch 59 has a cam follower 59A which rides on the surface of the cam. In the position shown the cam follower 59 is received in the recess 57A and the switch 59 is in open condition. When the motor 55 rotates a short distance the cam follower 59A rides up out of the recess to close the switch 59. It will be noted that the motor 55 is energized through the switch 59.

When the motor is to be energized a relay or switch 61 is closed to shunt the switch 59. As soon as the motor rotates sufficiently for the switch 59 to close, the switch or relay 61 may be released and the motor 55 then will complete one revolution of operation.

The relay or switch 61 may be operated automatically for a short time at the end of each billing period. Alternatively the switch 61 may be manually operated to initiate a scanning operation.

The brushes on the plate 44 may be continuously in engagement with the commutators. In order to reduce friction loading of the meter, preferably the plate 44 is biased by a spring 44C to move the brushes slightly out of engagement with the commutators. When a scanning operation starts, a link 44D is actuated by the closing movement of the switch 59 to move the plate 44 against the bias of the spring 44C sufficiently to bring the brushes against the commutators.

It will be recalled that the edges of each dial bear numbers based on the 32 divisions into which the dial is divided. This permits a determination of the meter reading from an inspection of the dial markings. For example in FIG. 1 a reading of 24 is shown for the dial 43. Inasmuch as each division of the dial 43 corresponds to 32 divisions or units of the dial 41 the reading of 24 on the dial 43 corresponds to 24 × 32 or 768 units. In addition the reading of the dial 41 in FIG. 1 indicates 23 units. Consequently the reading of the two dials is 768 + 23 or 791 units. Assuming that the gearing G2 is selected to provide a dial constant such that each division or unit of the dial 41 represents 10 kilowatt hours of energy consumed, the total reading of the dials in FIG. 1 represents 791 × 10 or 7,910 kilowatt hours. It will be understood that by suitable selection of the gearing other dial constants or multipliers may be employed.

Figure 2:
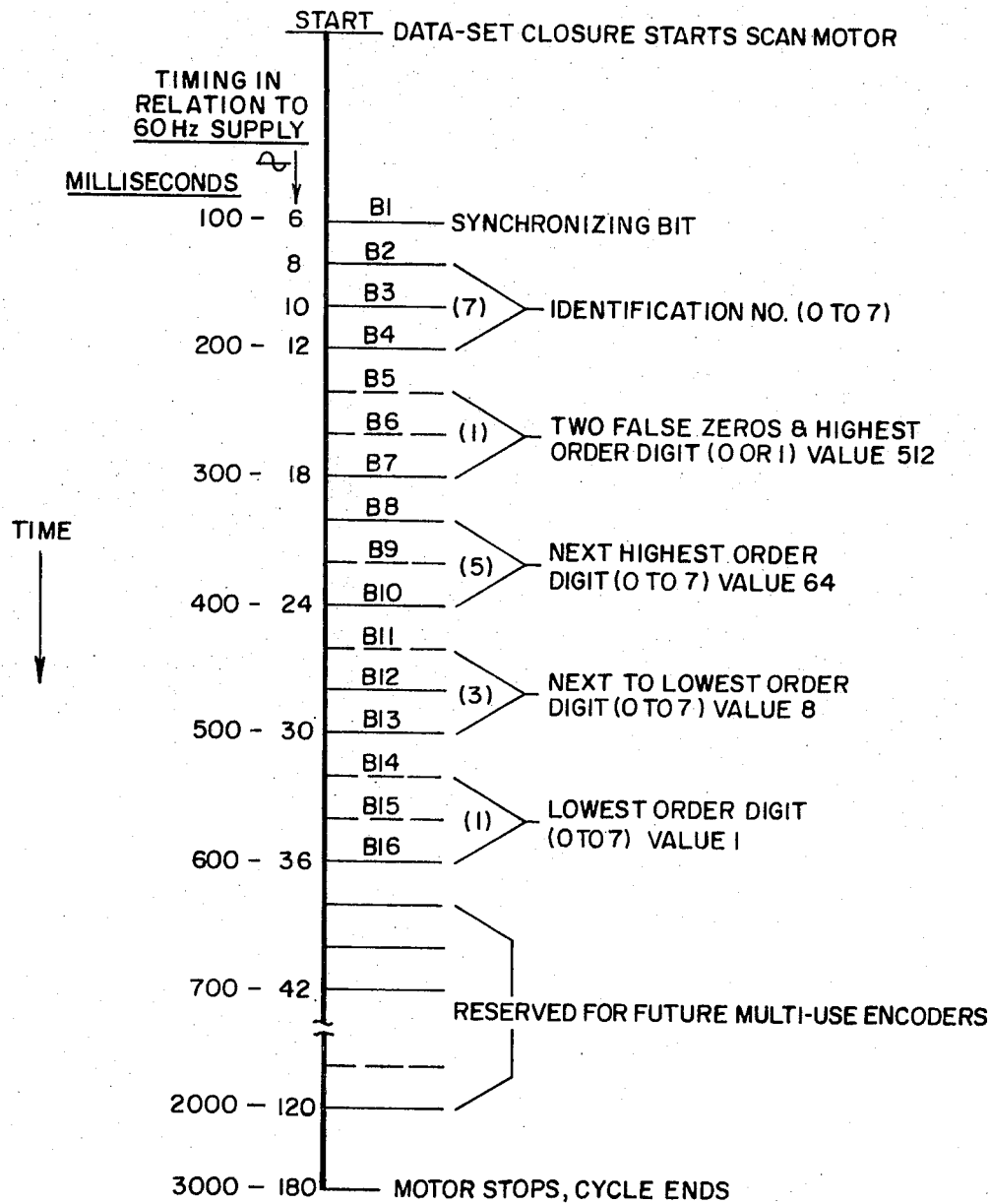
FIG. 2 is a chart showing the sequential operation of the system of FIG. 1.

The operation of the system of FIG. 1 now will be considered with particular reference to the chart illustrated in FIG. 2. In this chart the vertical scale measures time from the start of a scanning operation. Time is shown in milliseconds (ms) and in cycles based on a supply frequency of 60 Hertz.

Each signal derived from a scanner contact 6A is represented in FIG. 2 by a horizontal line. A solid line represents a one-bit signal and a dotted line represents a zero-bit signal.

It will be recalled that each consumption of 10 kilowatt hours of energy causes the armature disc 13 of the meter acting through the gearing G2 and the Geneva movement G1 to advance the dial 41 one step or one division. Each 360° revolution of the dial 41 causes the dial 43 to advance one step or one division. These advances are by jump actions. It will be assumed at the time the reading of the dials 41 and 43 is to be transmitted the dials have a reading corresponding to 8,570 kilowatt hours.

When the translating unit TU is to be interrogated the switch 61 is closed. Such closure may be manual or it may be effected by a signal transmitted in a well-known manner by a telephone line. Closure of the switch energizes the synchronous motor 55 to start a scanning operation. The synchronous motor may be of a permanent-magnet-motor type which reaches synchronous speed in one cycle and which is geared to rotate the arm 53 at a rate of 20 revolutions per minute. This provides a reading cycle which is completed in three seconds.

The resultant rotation of the cam 57 promptly closes the switch 59 to complete a holding circuit for the circuit energizing the motor 55 and operates through the link 44D to move the brushes on the plate 44 into engagement with their respective commutators.

After 100 milliseconds or six cycles sometimes brush 53A engages one of the scanner contacts 6A to generate a one-bit synchronizing signal B1. Such a signal cometimes is employed for synchronizing a receiver with the scanner 6.

At intervals of two cycles the brush 53A then engages successively three scanner contacts 6A to generate signals B2, B3 and B4 which are employed for identifying a specific meter being read. These three signals represents a binary number corresponding to a digital number between the values 0 and 7. In the specific example of FIG. 2 the three signals each has a one value corresponding to the digital number 7. The brush 53A next engages a scanner contact 6A to provide a signal B7. This signal is derived from the commutator on the dial 43 which has only one conductive segment and one insulating segment. This yields the highest order digit of the reading. It represents a binary zero-bit or a one-bit which correspond to the decimal value 0 and 512.

It will be noted that two additional "false" zeroes B5 and B6 are provided. These are desirable if the output of the scanner is to be supplied to a binary-coded-decimal (BCD) computer.

The brush next engages successively three scanner contacts 6A which supply signals B8, B9 and B10 which provides the next highest order digit. These signals provide a binary number corresponding to a digital number between 0 and 7. In the specific illustration of FIG. 2 the number 5 is illustrated.

In its continued motion the brush 53A next engages successively scanner contacts yielding the signals B11, B12 and B13. These again yield a binary number corresponding to the decimal numbers 0 to 7 and the number 3 is specifically represented in FIG. 2.

The lowest number digit is determined by the signals B14, B15 and B16 which are generated by continued motion of the brush 53A. These yield binary numbers corresponding to the decimal numbers 0 to 7. The illustration of FIG. 2 corresponds to a decimal number of 1.

The highest-order digit has a value of 512. The next highest-order digit has a unit value 64 or a total value of 5 × 64 = 320. The next-to-the-lowest-order digit has a unit value of 8 or a total of 3 × 8 = 24. The lowest order digit has a value of 1. Summing the values of these four digits we obtain a resultant of 857 which represents a consumption of 8,570 kilowatt hours.

After completing its scan of the group of scanner contacts 6A a similar scan is performed for the group of scanner contacts 6B and other similar groups which may be provided. For present purposes it may be assumed that three groups are provided. The scanning of the three groups may be completed in 2,000 milliseconds or 120 cycles. At this point if the information is being transmitted to a telephone data set the data set may be cut off. At the end of 3,000 milliseconds or 180 cycles the cam follower 59A enters the recess 57A to open the switch 59 which deenergizes the motor 55 and which releases the plate 44 for movement to disengage the brushes from the commutators.

I claim as my invention:

1. In apparatus for transmitting information from a meter having a shaft driven register; a gear means having an input and plural outputs, said input being coupled to the meter shaft, and each of the outputs being rotatable in steps at a rate such that one output is rotated by one step when another output is rotated through predetermined number of steps; plural analog to digital converters each having a dial rotated by one of said plural outputs of said gear means, each of said dials having distinct angular step positions corresponding to the step positions of the associated gear means output, each dial including a commutator having plural rings of conductive and insulating segments on the face of the dial and being located at alternate step positions of the dial within each ring for translating each of the step positions into a distinctive binary code, each of said converters further having plural brushes associated with each commutator thereof; a scanning means including a plurality of contacts and a brush for sequentially engaging the contacts, each of said plurality of contacts being connected to a separate brush of said plural brushes of the converters; a plate means carrying said plural brushes of the converters for movement between engaging and disengaging positions of the brushes relative to the associated commutator; a spring member normally biasing said plate means to the brush disengaging position; a rotatable cam; a movable linkage coupling said cam and said plate means, one position of said cam being effective for positioning said linkage so that said plate means assumes said brush disengaging position and upon rotation of said cam away from said one position being effective for positioning said linkage so that said plate means is in said brush engaging position; a motor means coupled to both said cam and said brush of said scanner for concurrent rotation thereof; and a switch means for effecting energization of said motor means, said switch means including a pair of contacts operable by said cam between open and closed positions, respectively, when said cam is at said one position and when said cam is away from said one position, whereby upon initial energization of said motor means rotation of said cam concurrently effects said brush engaging position of said plate means and energization of said motor means for a predetermined scanning movement of said brush of said scanning means.

2. In the apparatus claimed in claim 1 wherein said meter is a watthour meter.

3. In the apparatus claimed in claim 2 wherein each of said dials has 32 step positions.

4. In the apparatus claimed in claim 3 wherein there are two of said dials and five brushes associated with each of the commutators thereof for developing a binary code representing a highest order of at least 10,000 kilowatt hours.

* * * * *